Oct. 3, 1967     C. STELLA     3,345,629
ANALOGUE CONVERTER
Filed May 1, 1964     5 Sheets-Sheet 1

CARL STELLA
INVENTOR.

Oct. 3, 1967

C. STELLA 3,345,629

ANALOGUE CONVERTER

Filed May 1, 1964

CARL STELLA
INVENTOR.

BY S.A. Giarratana
George B. Oujevolk

ATTORNEYS

CARL STELLA
INVENTOR.

BY S. A. Giarratana
George B. Oujevolk

ATTORNEYS

United States Patent Office 3,345,629
Patented Oct. 3, 1967

3,345,629
ANALOGUE CONVERTER
Carl Stella, Bronx, N.Y., assignor to General Precision, Inc., Little Falls, N.J., a corporation of Delaware
Filed May 1, 1964, Ser. No. 364,146
6 Claims. (Cl. 340—347)

ABSTRACT OF THE DISCLOSURE

In a multi-speed synchro system, while the receiving synchros of the system are being driven forward by driver means from the electrical zero postion to the null position by control means, a time correlated signal is derived from a reference signal source by a gating arrangement. This gating arrangement will selectively switch the source so as to provide said time correlated signal during the time the driver means drive the system back to the electrical zero position.

---

This invention relates to an analogue converter and more particularly to an analogue converter for converting angular displacement to a time correlated signal.

It is often desirable to measure the angular displacement of a body such as, for example, a shaft or the like from a predetermined position. For example, in certain applications for positioning a shaft, i.e., applications in which a shaft is rotated between two predetermined positions, it is often necessary to determine the angular displacement being incurred and/or incurred by the shaft which is rotated. Still in other applications where the rotation of a shaft is utilized as an analogue to represent some quantity, a means for determining the angular displacement of the shaft is often a requisite. Moreover, in these applications it is generally essential that the means for determining the angular displacement be highly accurate and/or reliable.

An object of this invention is to provide an analogue converter for converting angular displacement to a time correlated signal.

Another object of this invention is to provide an analogue converter of the aforementioned kind which can be rapidly recycled.

Still other objects of this invention are to provide an analogue converter of the aforementioned kind which is highly accurate and/or reliable.

As is well known to those skilled in the art, and as defined herein, a multi-speed transmission synchro system comprises two or more synchro generators, which are generally referred to as synchro transmitters or simply as transmitters, and the rotors of which are intercoupled via suitable gear means, so that a given angular displacement in one causes predetermined mutually exclusive different angular displacements in the others. As a result, the transmitters transmit at different speeds and the multi-speed transmission synchro system is generally referred to in the art by the number of transmitters being so utilized in the system. Thus, for example, a double-speed transmission synchro system has two such synchro transmitters geared together, a triple-speed transmission synchro system has three, and so on. The individual speeds at which the synchros comprised in the multi-speed transmission system transmit or operate depends upon the number of revolutions made by the rotor of the particular synchro for each revolution of the input shaft to the multi-speed system and is generally expressed as a multiple thereof. For example, if only one revolution of the rotor of a particular synchro is made for one revolution of the input shaft, the synchro is said to be operated at one-speed. If two revolutions are made for one revolution of the input shaft, then the synchro is said to be operated at two-speed, and so forth. Thus, a synchro transmitter operated at 36-speed would make 36 rotor revolutions for one revolution of the input shaft. Likewise, a similar terminology exists for a multi-speed receiving synchro system, the latter comprising at least two synchro receivers of the same type; such as, for example, of the synchro motor type or of the control transformer type, whose rotors are adapted by suitable gear means to be operated at mutually exclusive different speeds. For example, a multi-speed receiving synchro system having three receivers would be referred to as a triple-speed receiving synchro system and the synchros would operate at three predetermined different speeds, e.g., one-speed, two-speed, and 36-speed, respectively.

In a synchro system, the synchro transmitters and receivers, when at rest, i.e., in the absence of any action, are so positioned, that the electrical output from the receiver is zero. This is known as the zero position. When the transmitter is caused to rotate, a signal is then transmitted to the receiver which has remained at the zero position while the physical position of the transmitter has changed. A feedback loop is provided from the output side of the receiver to the receiver, causing the receiver in turn to rotate until there is again no output from the receiver. This is known as the null position. The invention in its broadest aspects contemplates providing a time correlated signal corresponding to an angular displacement acting on a multi-speed synchro system and generally includes a forward drive cycle arrangement geared to a desired time base during which time the receiver is driven from its zero position to the null position. The output signal is provided during this drive time and the time duration of this signal is a measure of the angular displacement acting on the synchro system. Upon reaching the null position, the system generates a command to return to the zero position. In the reverse drive cycle, the synchros are all geared one to one for fast slewing. When each synchro has reached its zero position, the synchro is removed from the gear train by clutch means. As each synchro reaches its zero position switch means are closed so that when all the synchros have reached the zero position a circuit is closed which stops the reverse drive and establishes the system conditions which prevailed prior to the forward drive command. The system is then ready to measure a second angular displacement.

Accordingly, this invention features an analogue converter for converting angular displacement to a time correlated signal which comprises, inter alia, in combination a multi-speed transmission synchro system having a plurality of synchro transmitters and associated first gear means and a related multi-speed receiving synchro system having a corresponding plurality of synchros, of the control transformer type, and associated second gear means, responsive thereto. In addition, there is provided a control means that controls in a predetermined manner the actions of a gating means and driver means, which are also comprised in the analogue converter of this invention. A source of reference signal is provided and coupled to the gating means which together with the control means coact to provide the time correlated signal. The driver means is utilized to drive in a predetermined manner the rotors of the control transformers, which are comprised in the multi-speed receiving synchro system. Briefly, in operation, the multi-speed transmission synchro system provides an output signal which is proportional to the angular displacement to be converted and which is transmitted to the related multi-speed receiving synchro system. As a consequence, at the output of the multi-speed receiving synchro system there is also provided a second signal which is proportional to the transmitted signal of the multi-speed transmission synchro system. The aforementioned second signal is sensed by the control means and utilized to actuate the gating means, and the control means provides a control signal which causes the driver means to rotate the rotors of the control transformers from the electrical zero position to the null position of the multi-speed receiving system.

The angular displacement incurred by the rotors of the multi-speed receiving synchro system during this period, i.e., the period during which the multi-speed receiving synchro system is driven from its electrical zero position to its null position, is related to the angular displacement being converted and sensed by the multi-speed transmission synchro system. By judiciously controlling the action of the gating means during this period, a time correlated signal that is derived from the source of reference signal and proportional to the driving speed of the driver means is provided and consequently is proportional to the angular displacement being converted. When the multi-speed receiving synchro system reaches the null position, the second output signal as is well known to those skilled in the art is substantially zero and/or negligible. The control means in response thereto causes the driver means to rotate the rotors of the control transformers from the null position of the multi-speed receiving system to the aforementioned electrical zero position and thus the analogue converter of the invention is recycled.

Still another feature of this invention is the provision of an analogue converter of the aforementioned kind wherein the multi-speed receiving system thereof further comprises an auxiliary gear means adapted to reset rapidly the control transformers to the electrical zero position when being driven by the driver means from the null position to the electrical zero position.

The above-mentioned and other features and objects of this invention will become apparent by reference to the following description taken in conjunction with the accompanying drawing, in which.

Figure 2A:
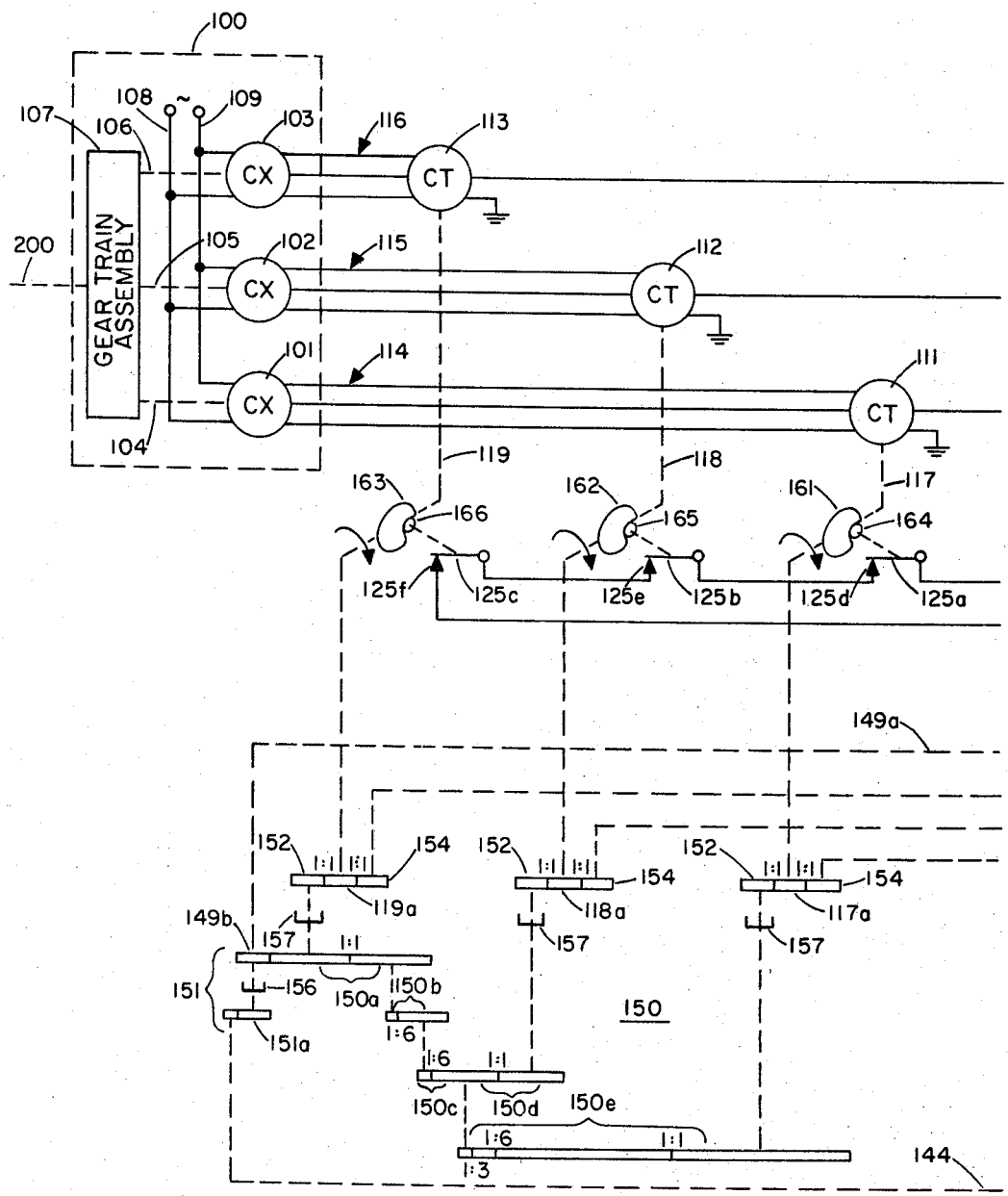
FIGS. 2a and 2b are schematic diagrams, illustrated partially in block form, of a preferred embodiment of the analogue converter of this invention.
Figure 2B:
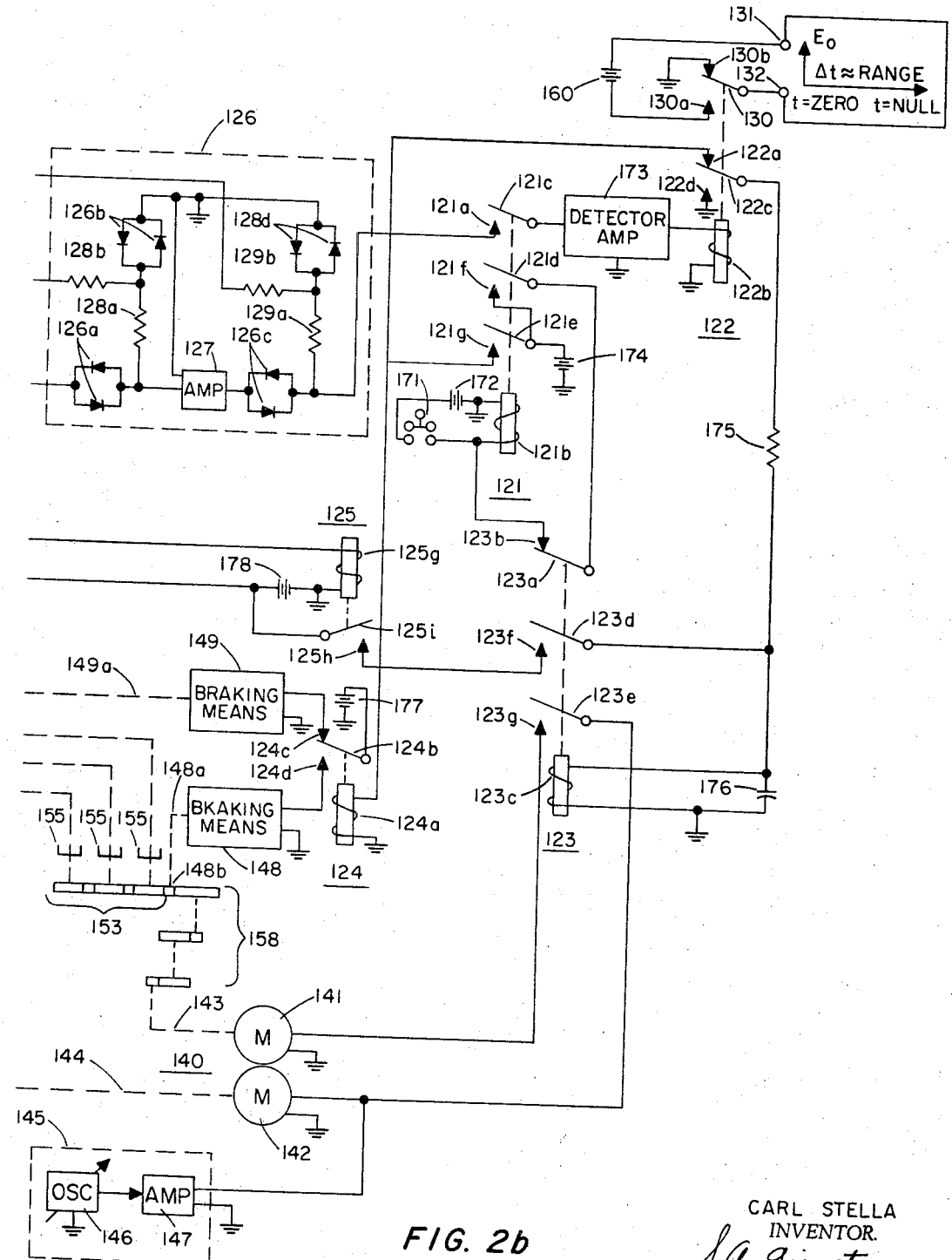
Figure 5:
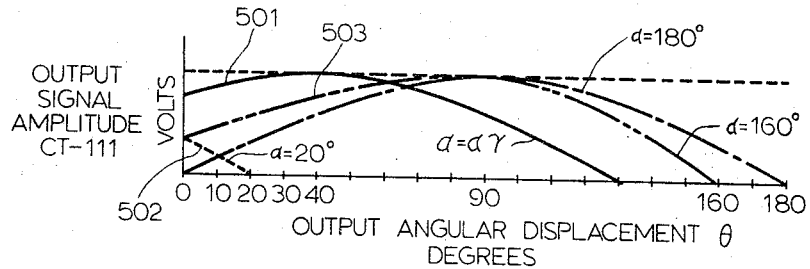
Figure 6:
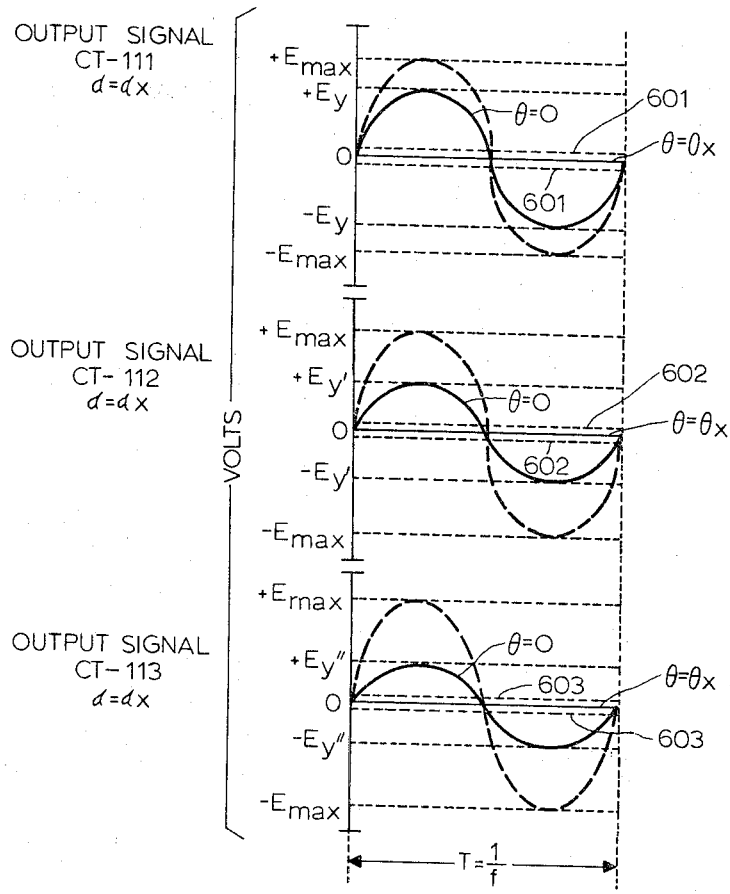

FIG. 5 shows more waveforms helpful in explaining the operation of the embodiment of FIG. 2, illustrating the amplitude of the output signals of the control transformers' rotor windings for certain different angular displacements of the triple-speed transmission-synchro system as a function of the angular displacement of the controls transformers; and FIG. 6 shows still further waveforms helpful in explaining the operation of the embodiment of FIGS. 2a and 2b, illustrating typical cycles of the various output signals of the control transformers' rotor windings for certain angular displacements of the control transformers and a given angular displacement of the triple-speed transmission synchro system.

Figure 1:
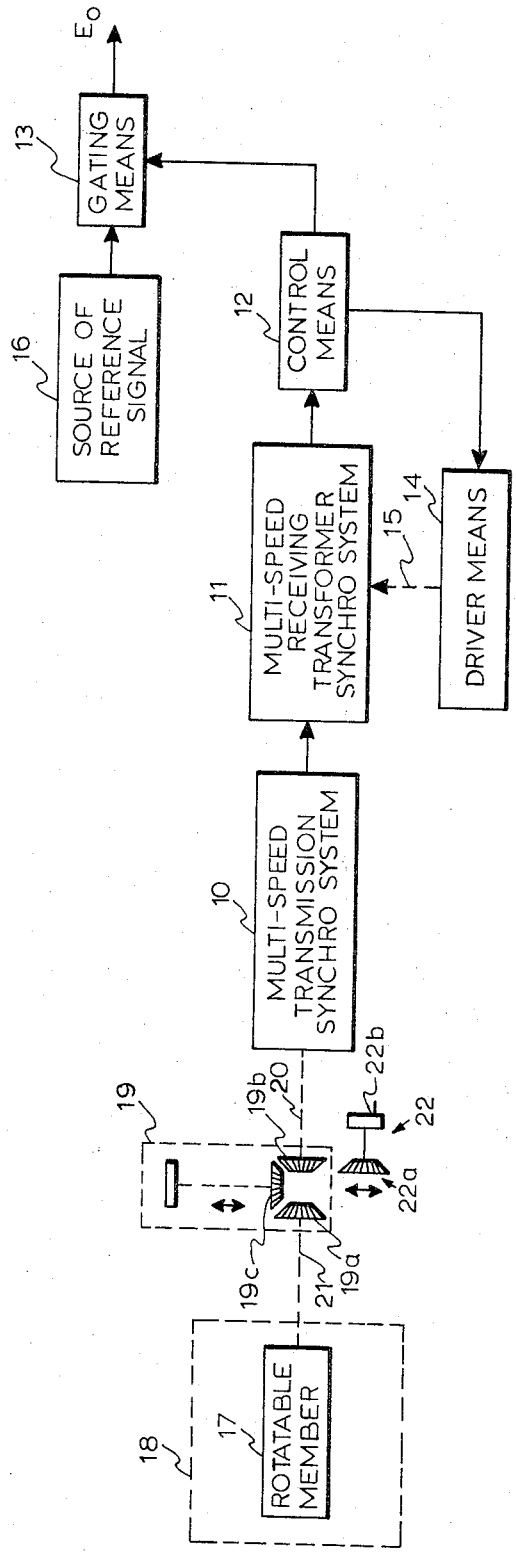
FIG. 1 is a block diagram of the analogue converter of this invention.

Referring to FIG. 1, the analogue converter of this invention broadly comprises a multi-speed transmission synchro system 10 which is coupled to a related multi-speed receiving synchro system 11 of the control transformer type. As explained above, the multi-speed transmission system 10 is comprised of a plurality of synchro transmitters, not shown, which transmit at mutually exclusive different speeds, the rotors, not shown, of which are intercoupled by suitable gear means for this purpose in a manner well known to those skilled in the art. The related multi-speed receiving system 11 is comprised of a corresponding plurality of synchro receivers, not shown, of the aforementioned control transformer type, the rotors, not shown, of which are likewise intercoupled by suitable gear means so that the control transformer synchros operate at mutually exclusive different speeds which are compatible to the speeds of the transmitters comprised in system 10.

In addition, a control means 12 is provided which controls the respective actions of gating means 13 and driver means 14 in a predetermined manner which is described hereinafter. The driver means 14, via the connecting shaft means 15 illustrated in FIG. 1 as a dash line, is coupled to the multi-speed receiving synchro system 11 and is utilized for driving the rotors of the control transformer synchros comprised therein. A source 16 of reference signal is coupled to gating means 13 and the time correlated signal $E_o$ is derived therefrom at the output of gating means 13.

In practice, multi-speed transmission synchro system 10 and multi-speed receiving synchro system 11 are preset at their respective electrical zero positions and multi-speed transmission synchro system 10 is adapted to be adjusted to the angular displacement to be converted. If, for example, the angular displacement of a rotatable body or member 17 comprised in a non-related device or system 18 is to be converted, the rotatable member is coupled by compatible coupling means 19 to the input shaft means, illustrated as a dash line 20, of the multi-speed system 10. As illustrated in FIG. 1, coupling means 19 comprises, by way of example only, two bevel gears 19a, 19b connected to the shaft 21 of member 17 and shaft means 20 of system 10, respectively, and a movable interconnecting bevel gear 19c which engages gears 19a and 19b when moved to the appropriate position. Consequently, any angular displacement of the member 17 of the non-related device, when gears 19a, 19b, and 19c are engaged and inter-meshed, causes a corresponding proportional angular displacement from the electrical zero positon in the system 10. Alternately, the non-related member 17 need not be coupled to the system 10 in which cases the input shaft means 20 of multi-speed system 10 is adjusted independently as, for example, by suitable manual means to an angular displacement which is proportional to the angular displacement of the aforementioned member. By way of example only, manual means 22 is illustrated as comprising a movable bevel gear and crank assembly 22a, 22b, the gear 22a of which engages gear 19b when moved to the appropriate position.

Still in other cases, the angular displacement of the multi-speed transmission synchro system 10 per se is converted such as, for example, in certain types of computer applications and the like where the angular displacement to the input shaft means 20 of the system 10 is not associated with the angular displacement of any particular rotatable member located in a non-related device or system as explained above but instead is utilized as an analogue to represent some intangible physical quantity. In these cases, the input shaft means 20 is adjusted independently by suitable means such as, for example, by manual means 22 by cranking in the appropriate value of the intangible physical quantity.

In operation, the multi-speed transmission and receiving systems 10, 11 are each initially preset at their electrical zero positions as aforementioned. Under this condition, the respective rotors of each of the synchro transmitters comprised in system 10 and the respective rotors of each of the synchro receivers comprised in system 11 are in their electrical zero positions. When the rotors of the synchro transmitters are displaced from their electrical zero positions by an amount proportional to the angular displacement being converted and dependent upon the relative speeds of each, a multi-channel transmission signal is transmitted from the system 10 to the multi-speed receiving synchro system 11. Each particular synchro transmitter transmits exclusively to the synchro receiver that has the same operational speed as that of the particular transmitter. As is well known to those skilled in the art, the multi-speed receiving synchro system 11, which as aforementioned is of the control transformer type, remains in its electrical zero position and provides at the output thereof a second output signal which is proportional to the signal transmitted from system 10 and which is hence proportional to the angular displacement to be converted.

To obtain a time correlated signal, control means 12 is initiated to sense the output signal, if any, from system 11. In the presence of an output signal from system 11, the control means 12 provides a control signal which causes driver means 14 to drive multi-speed receiving synchro system 11 from its electrical zero position to its null position which is reached when each of the rotors of the control transformer synchros is in a null position with respect to its associated control transformer stator. During this preiod, i.e., when the system II is driven from its electrical zero position to its null position, the output signal sensed by control means 12 controls the action of gating means 13 so as to allow the source 16 of reference signal to provide a time correlated signal $E_o$ to be present at the output of gating means 13. When the system 11 reaches its null position, the output signal from system 11 is substantially zero and/or negligible and the control means 12 in response thereto causes the driver means to return the system 11 from its null position to its electrical zero position. Concurrently therewith, the action of gating means 13 is such that the presence of time correlated signal $E_o$ is terminated at the output of gating means 13. By judiciously selecting the speeds utilized by the synchro transmitters of system 10 and the synchro receivers of system 11, the control means 12 can be made highly sensitive to low amplitude levels of the output signal of system 11 and thus provide a highly accurate and reliable time correlated signal $E_o$. During the period that the multi-speed receiving synchro system 11 is driven from its electrical zero position to the null positon, the speed of driver means 14 and consequently the action of gating means 13 during this period governs the duration of the time correlated signal $E_o$. For obvious reasons, it is advantageous, but not essential, to have the multi-speed receiving synchro system 11 during this period driven at a low or slow rate as is practicable.

An auxiliary gear means is provided in system 11 and is adapted to provide a rapid resetting to the electrical zero positions of the control transformers compressed on system 11 when the latter is being returned from the null position to the electrical zero position, as will become more apparent from the following description of the embodiment illustrated in FIG. 2.

Referring to FIG. 2, there is illustrated and now described in greater detail a preferred embodiment of the analogue converter of this invention. Accordingly, the multi-speed transmission synchro system of this embodiment comprises a triple-speed transmission synchro system 100. As previously explained, the triple-speed transmission synchro system 100 is comprised of three synchro transmitters 101, 102, 103, the rotors, not shown, of which are intercoupled via their respective rotor shafts, shown as dash lines 104, 105, 106, respectively, by a suitable gear means such as gear train assembly 107 which is illustrated in block form for the sake of clarity. In this manner the transmitters 101, 102, 103 are adapted to transmit or operate at three mutually exclusive different speeds. Of course, as is well known to those skilled in the art, the rotor windings, not shown, are connected to a suitable source, not shown, of A.C. supply of a given frequency $f$ by suitable coupling means such as, for example, the conductor mains 108, 109.

Figure 3:
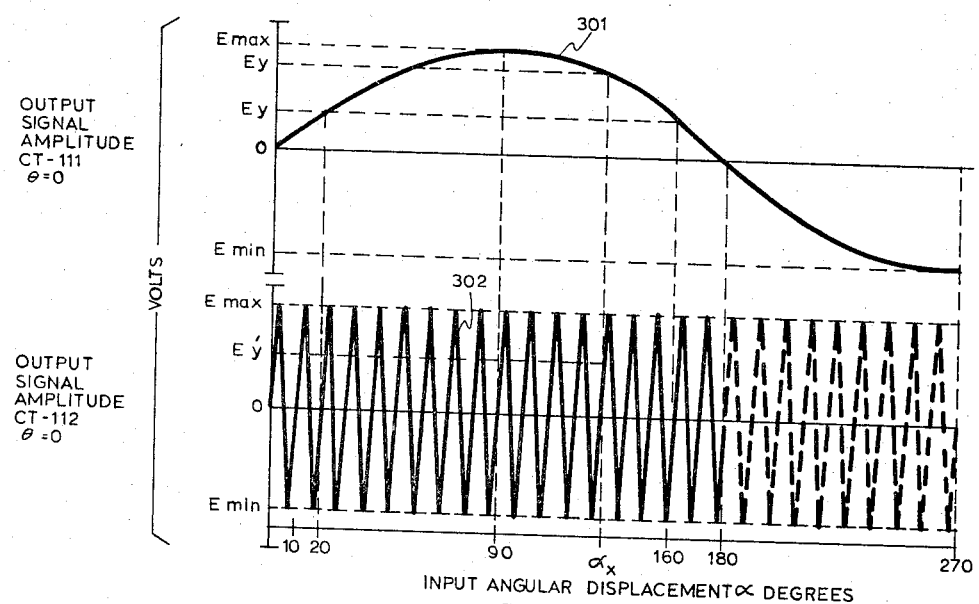
FIGS. 3 and 4 are waveforms helpful in explaining the operation of the embodiment of FIG. 2, which illustrate the amplitude of the respective signals induced in the rotor windings of the control transformers while the latter are in their electrical zero positions as a function of the angular displacement of the triple-speed transmission synchro system.

The related triple-speed receiving synchro system of the embodiment of FIG. 3 is comprised of three synchro receivers of the aforementioned control transformer type, viz., control transformer synchros 111, 112, 113. As is well known to those skilled in the art, the stator winding, not shown, of each synchro transmitter of system 100 is exclusively coupled by one of the appropriate groups or channels 114, 115, 116, of conductors to the stator winding, not shown, of one of the control transformer synchros. The rotors, not shown, of synchros 111, 112, 113, via their respective rotor shafts illustrated as dash lines 117, 118, 119, respectively, are intercoupled by suitable gear means comprised in the gear train assembly generally indicated by the reference numeral 150 and which is described in greater detail hereinafter. The gear means is arranged to operated inter alia each of the control transformer synchros at a mutually exclusive different speed that is equal to the speed of the synchro transmitter comprised in system 100 to which it is coupled. In the preferred embodiment, synchro transmitters 101, 102 and 103 of system 100 are selected to transmit at one-speed, 36-speed, and 648-speed, respectively, and consequently control transformer synchros 111, 112, and 113, are adapted to operate likewise, in the given example, at one-speed, 36-speed, and 648-speed, respectively, as indicated by the appropriate gear ratios illustrated in FIG. 2 for assembly 150 and are referred to hereinafter as the coarse, medium, and fine speeds, respectively.

The control means of the embodiment of FIG. 2 comprises a plurality of relay circuit means indicated generally by the reference numerals 121–125 and a suitable transfer circuit 126. The transfer circuit 126 is coupled to the respective rotor windings, not shown, of the control transformer synchros 111–113, and senses the A.C. error signals, if any, induced in these windings. As a result, at contact 121a of the relay circuit means 121, circuit 126 provides an output signal that is proportional to the error signals, if any, of the three control transformer synchros 111–113.

For example, when the amplitude of the error signal of the coarse-speed synchro 111 is greater than a first predetermined level, the diodes of pair 126a sequentially or alternately conduct depending on the particular phase of the A.C. error signal. If the diodes of the other pair 126b are not conducting, the coarse-speed error signal sensed by diode pair 126a is coupled directly to the input of amplifier 127. However, if the diode pair 126b is also conducting, the coarse-speed error signal sensed by diode pair 126a is shunted across the input of amplifier 127 via a resistance comprising the series connected resistor 128a and forward resistance of diode pair 126b. When the amplitude of the coarse-speed error signal is substantially equal to or less than the aforementioned first predetermined level, diode pair 126a stops conducting and in effect presents an open circuit to the coarse-speed error signal. If the amplitude of the medium-speed error signal of synchro 112 is greater than a second predetermined level, the diode pair 126b also sequentially conduct and the medium-speed error signal is coupled to the input of amplifier 127 via the voltage divider T-network comprising the two, series connected, resistor arm branches composed of resistances 128a, 128b, respectively, and the resistor leg branch formed at their junction and composed of the forward resistance of diode pair 126b. When the amplitude of the medium-speed error signal is substantially equal to less than the aforementioned second predetermined level, the diode pair 126b ceases to conduct and in effect presents an open circuit to the medium-speed error signal which is then coupled directly to the input of amplifier 127 via the series combination of resistances 128a, 128b. In a similar manner, diode pair 126c is adapted to conduct if the amplitude of the output signal from amplifier 127 is greater than a third predetermined level which, in the illustrated embodiment, is dependent upon the input threshold level of amplifier 127. If diode pair 126d is also conducting, then the output signal from amplifier 127 is indirectly connected to the contact 121a by being shunted across a resistance comprising the series connected resistance 129a and forward resistance of the diode pair 126d. If diode pair 126d is not conducting, then the output signal of amplifier 127 is coupled directly to the contact 121a. When the input signal to amplifier 127 is less than the aforementioned threshold level, the output signal of amplifier 127 will be substantially equal to or less than the aforementioned third predetermined level, and diode pair 126c will cease conducting. The input signal to amplifier 127, as is obvious, is derived from the coarse-speed and medium-speed error signals, alone or in their various possible combinations. The diode pair 126d conducts when the amplitude of fine-speed error signal is greater than a fourth predetermined level in which case the fine-speed error signal is coupled to the contact 121a via the voltage divider T-network comprising the two, series connected, resistor arm branches composed of resistances 129a, 129b, respectively, and the resistor leg branch formed at their junction and composed of the forward resistance of diode pair 126d. When the amplitude of the fine-speed error signal is equal to or less than the fourth predetermined level, the diode pair 126d stops conducting, and the fine-speed error signal is directly coupled to the contact 121a via the series connected resistances 129a, 129b. By judiciously selecting the aforementioned first, second, third, and fourth levels, as well as the threshold level of amplifier 127, the transfer circuit 126 thus provides an output signal at contact 121a which is proportional to the various error signals sensed alone or in their various possible combinations. Of course, as is obvious to those skilled in the art, when all the error signals provided by the control transformer synchros are zero or become negligible, the output signal at contact 121a will likewise be negligible or zero.

The control means controls the respective actions of a gating means, which comprises the armature switch 130 of relay circuit means 122 and a pair of output terminals 131, 132, and of a driver means illustrated generally by the reference numeral 140. A source of reference signal, illustrated in FIG. 2 by way of example only as comprising a battery 160, is coupled to the terminal 131 and contact 130a. When armature switch 130 is placed in contact with contact 130a, battery 160 provides an output signal $E_o$ at the terminals 131, 132. The driver means 140 of FIG. 2 comprises a pair of motors 141 and 142, the shafts 143, 144 of which are connected to the gear train assembly 150. The input windings, not shown, of motors 141, 142 are adapted to be energized by a suitable source 145 of electrical energy. In the illustrated embodiment motors 141, 142 are selected to have substantially identical speed characteristics which are porportional to the frequency of the signal energizing their respective input windings. Thus, in the embodiment of FIG. 2, source 145 is illustrated as comprising an adjustable oscillator means 146 having a highly stable frequency-output such as, for example, a variable frequency crystal oscillator that is coupled to an amplifier 147. To enhance the cycling period of the embodiment illustrated in FIG. 2, the motor 142 is maintained continuously connected to the source 145 and hence is in constant operation. Furthermore, in the illustrated embodiment motor 141 in coaction with gear train assembly 150 rotates the rotor shafts 117–119 in predetermined directions; and motor 142 in coaction with gear train assembly 150 rotates the rotor shafts 117–119 in directions which are opposite to the aforementioned predetermined directions. Driver means 140 further comprises a pair of electrically-operated braking means 148, 149 which are connected to gear train assembly 150 and which are selectively operated by the relay circuit means 124 comprised in the control means of FIG. 2. Braking means 148 and 149 have respective controlled shafts 148a and 149a to which are affixed gears 148b and 149b, respectively.

When energized, braking means 148, 149 are in their locked positions and hence prevent rotation of their respective shafts 148a and 149a. Conversely, when braking means 148, 149 are not energized, they are in their unlocked positions and their respective shafts 148a and 149a are rotatable. The rotation of motor shaft 144 is transmissible, via gear train sub-assemblies 151, 150a, 150b, 150c, 150d, 150e and gears 152, to the gears 117a, 118a and 119a, which are affixed to the rotor shafts 117, 118 and 119, respectively, when braking means 149 is unlocked. Motor 142 drives or operates the control transformer synchros 111, 112, 113 at their respective predetermined speeds which for the given example are, as aforementioned, one-speed, 36-speed and 648-speed, respectively. To prevent the rotation in gear train sub-assembly 153 by gears 154 when gears 117a, 118a, 119a are being driven by motor 142, and gear 148b is locked, slip clutches 155 are provided on the respective shafts interconnecting gears 154 and gear train sub-assembly 153. To allow the motor shaft 144 of continuously operated motor 142 to rotate freely when the gear 149b is locked, slip clutch 156 is provided on the shafts interconnecting gears 149b and 151a of gear train sub-assembly 151. Likewise, to prevent rotations in gear train sub-assemblies 150a, 150d and 150e by gears 152 when gears 117a, 118a, 119a are being rotated and the gear 149b is locked, slip clutches 157 are provided on the respective shafts interconnecting gears 152 to the appropriate gears of sub-assemblies 150a, 150d and 150e. As shown in FIG. 2, the rotation of motor shaft 143 is transmissible to the gears 117a, 118a, 119a via the auxiliary gear means comprising gear train sub-assembly 158, gear 148b, gear train sub-assembly 153, and gears 154; and motor 141 drives the synchros at substantially equal speeds.

By way of example only, slip clutches 155, 157 are of the free-wheeling, overriding clutch type whose engageable members, not shown, engage for a given direction of rotation and disengage for the opposite direction of rotation. Similarly, by way of example only, slip clutch 156 is of the free-wheeling, overriding clutch type whose engageable members, not shown, are engaged until the load reaches a predetermined value and causes the members to become disengaged. As is obvious, the direction of rotation for motor shaft 144 is thus selected to cause slip clutches 156, 157 when gear 149b is in the unlocked position to transmit the relative motion of shaft 144 to the rotor shafts 117–119 and to cause the latter to rotate in predetermined directions, e.g., counter-clockwise, as illustrated in FIG. 2. In operation, slip clutches 155 are so arranged as to prevent the counter-clockwise rotations of gears 117a, 118a, 119a from being transmitted to the gear train sub-assembly 153 when gear 148a is in the locked position. Furthermore, by reason of the particular configuration of the various gear train sub-assemblies chosen to illustrate the principles of the embodiment of FIG. 2, the direction of rotation of motor shaft 143 is selected to be opposite to the direction of rotation of motor shaft 144 and consequently the slip clutches 155 are capable of transmitting the relative motion of shaft 143, when gear 148a is in the unlocked position and motor 141 is energized, to the rotor shafts 117, 118, 119, driving the latter in directions, which for the given illustration are clockwise directions, that are opposite to their directions when being driven by the motor 142. In operation slip clutches 157 are likewise so arranged as to prevent the clockwise rotations of gears 117a, 118a, 119a, from being transmitted to the gear train sub-assemblies 150a, 150e, 150d, respectively, when gear 149b is in the locked position. Also slip clutch 156 is so arranged as to allow the motor shaft 144 to continue rotating freely when gear 149b is also in the locked position. The energizations of braking means 148, 149 and motor 141 are synchronized by the control means as will become apparent hereinafter.

Affixed on shafts 117–119 are respective cams 161, 162, 163 which coact with the respective rollers 164, 165, 166 to control the actions of switches 125a, 125b, 125c, respectively. Provided on each of the cam surfaces which are in contact with the rollers 164–166, is an indent having a configuration that blocks the movement of the respective associated rollers when engaged therein and for a given direction, which is clockwise for the illustration of FIG. 2, of rotation of the associated cam. However, when the cam is driven in the opposite direction, counter-clockwise for the illustration of FIG. 2, the configuration of the indent is such that the movement of the roller is not blocked or prevented when it engages the indent as is well known to those skilled in the art. Each of the cams 161–163 and their associated indents are affixed to the rotor shafts 117–119 in such a manner, that when the control transformer synchros 111–113 are in their respective electrical zero positions, the switches 125a, 125b, 125c are in contact with the contacts 125d, 125e, 125f, respectively, and when the synchros 111–113 are displaced from their electrical zero positions, the switches 125a–125c open accordingly. Hence, the direction of rotation of motor shaft 144 is such that the cams 161, 162, and 163 and their associated shafts 117–119 when rotated thereby, turn in directions, which for the illustration are counter-clockwise as aforementioned, so that the movement of the rollers are not prevented when they engage their respective indents; and the direction of motor shaft 143 is such that the cams 161–163 when rotated thereby turn in opposite directions so that the indents will block the movement of the rollers upon being engaged thereby. Since the rotor shafts 117–119 are driven by motor 141 via the auxiliary gear means when the control transformers 111–113 are being returned from their null positions to their electrical zero positions, only one revolution or less will be required by the control transformer's rotors to be returned to their electrical zero positions. As is obvious, the coaction of cam and rollers 161–166 and the control means of FIG. 2 is such that the rotation of motor shaft 143 is stopped when all three synchros 111–113 are in their electrical zero positions.

The details of the relay circuit means 121–125 will now be described in conjunction with the operative description of the preferred embodiment of FIG. 2. It is to be understood, however, that the analogue converter is illustrated in FIG. 2 with the triple-speed transmission synchro system 100 and the triple-speed receiving synchro system comprising the three control transformers synchros 111–113 and associated gear means as being in their electrical zero positions and that the relay armature switches of the various relay circuit means 121–125, as well as the other type of switches illustrated therein, are also shown in their normal positions in the illustrated condition of FIG. 2.

Referring now to FIGS. 2–6, in operation the synchro transmitters 101–103 are originally preset to their respective electrical zero positions. In these positions, the energized rotor windings of transmitters 101–103 induce substantially zero or negligible voltage in their respective transmitter stator windings and the angular displacement α to the input shaft means, illustrated as a dashline 200, FIG. 2, is at zero degree displacement. Likewise, the control transformer synchros 111–113 are originally preset at their respective electrical zero positions, i.e., a position of each control transformer rotor for which there is no substantial voltage induced into the control rotor winding from the control transformer stator winding when the particular transmitter to which the control transformer is coupled is also in its electrical zero position.

Figure 4:
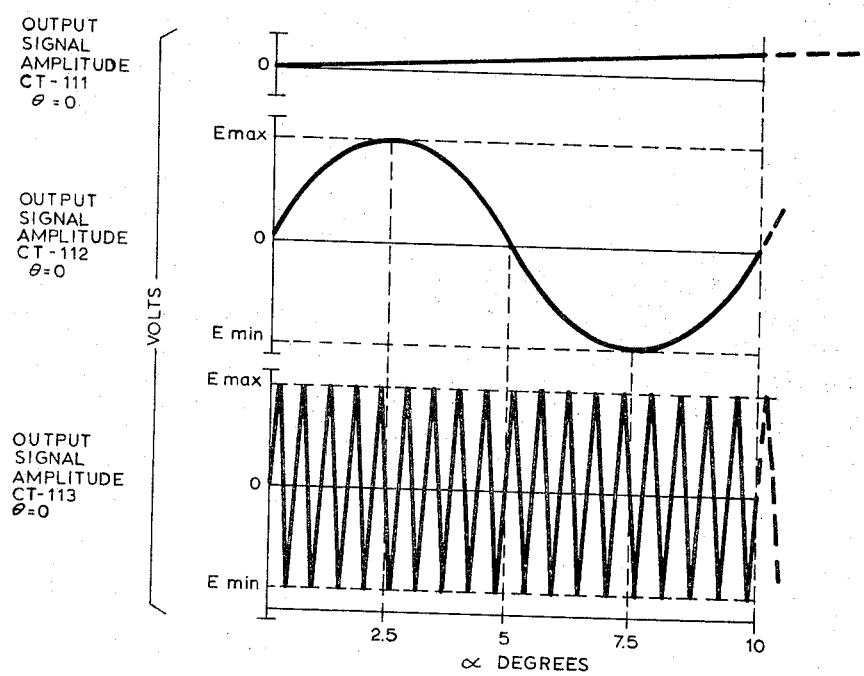

As is well known to those skilled in the art, when the input shaft 200 is displaced by suitable means, not shown, from its zero degree displacement, that is from the angular displacement α=0, each of the transmitter rotors are proportionally displaced from their respective electrical zero positions. However, the control transformer rotors, as aforementioned, remain in their electrical zero positions and as a consequence have induced in their rotor windings an error signal whose amplitude is proportional to the angular displacement α of the input shaft 200 as determined, for example, by the curves 301, 302, FIG. 3, which represent the amplitudes of the error signals induced in the rotor windings of control transformers 111 and 112, respectively, while the latter are in their respective electrical zero positions, plotted as a function of input angular displacement α to the input shaft means 200. The maximum angular displacement α of the input shaft means 200 is limited to be slightly less than 180 degrees and hence avoids any ambiguities as a result of the input shaft means 200 being at the 180° displacement and generating a null or zero error signal or as a result of the input shaft means 200 being at an angular displacement where the amplitude of the error signal changes phase as shown, for example, by the dash line part of curve 301. It is to be understood, however, that the limitation imposed on the angular displacement of shaft means 200 is merely for simplifying the explanation of the operation of the analogue converter of this invention and that the analogue converter of FIG. 2 can be modified to sense this change in phase and/or 180° null signal voltage in a manner well known to those skilled in the art without departing from the principles of the invention. For the sake of explanation, curves 401, 402, 403, FIG. 4, are illustrated to represent the amplitudes of the error signals induced in the rotor windings of control transformers 111, 112, 113, respectively, while the latter are in their respective electrical zero positions plotted as a function of input angular displacement from α equals zero degree to α equals ten degrees.

As a consequence, when the input angular displacement α is displaced a predetermined angular displacement such as, for example, $α_x$, FIG. 3, output error signals are induced in the respective rotor windings of control transformers 111, 112, 113 having amplitudes $E_y$, $E_y'$, and $E_y''$, respectively. When the rotors of control transformers 111–113 are driven from their electrical zero positions to their null positions, the amplitudes of the error signals in turn vary in a sinusoidal manner as a function of the output angular displacement θ of the triple-speed control transformer synchro receiving system of FIG. 2, the output angular displacement θ being proportional to the input angular displacement α. Thus, for example, for the given input angular displacement $α_x$, the amplitude of the output signal, which is induced in rotor winding of control transformer 111 as the latter is displaced from its electrical zero displacement, varies as indicated by the solid line curve 501, FIG. 5. As is obvious, no ambiguity arises for error signals having the same phase and amplitude, as shown for example, by the amplitude $E_y$ of the error signals for α=20°, FIG. 3, and α=160°, FIG. 3, and whose respective amplitudes vary as indicated by the dash line 502, FIG. 5, and the dash line 503, FIG. 5, respectively.

As is seen from FIG. 6, the amplitude of the output error signal cycles of the control transformers 111–113, for the given input angular displacement $α=α_x$, vary from their zero displacement values, $E_y$, $E_y'$, $E_y''$, respectively, up to their maximum value E max and down to their null value $E=0$, as the output angular displacement goes from $θ=0$ to $θ=θ_x$. Dash lines 601, FIG. 6, represent the amplitude levels of the output error signal from synchro 111 between which diode pairs 126a do not conduct. Similarly, dash lines 602, 603 represent the amplitude levels of the respective output error signals from synchros 112, 113 between which the diode pairs 126b and 126d, respectively do not conduct. In the manner already described, the error signals, if any, of control transformer synchros are passed or transferred to the contact 121a.

To determine if an error signal is present at contact 121a, an automatic release switch 171 is temporarily closed causing battery 172 to energize the relay winding 121b and consequently placing armature relay switches 121c, 121d, and 121e in contact with contacts 121a, 121f, and 121g, respectively. In this manner, the input of detector amplifier 173 is coupled to the output of transfer circuit 126. Also battery 174 is coupled by the circuit path comprising contact 121f, armature relay switches 121d, 123a, and contact 123b to the winding 121b causing the latter to remain in its energized position, the switch 171 being released when this event occurs. Battery 174 is also coupled by the circuit path comprising armature relay switch 121e and contact 121g to contact 122a and also to the relay winding 124a of relay circuit means 124 which has a predetermined response time.

If no error signal is detected by the amplifier 173, relay winding 122b which is coupled to the output of amplifier 173 remains in an unenergized condition so that the armature relay switch 130 remains in contact with contact 130b and no output signal is provided at the output terminals 131, 132. Furthermore, armature relay switch 122c remains in contact with contact 122a coupling battery 174 to the relay winding 123c via the integrating circuit comprising resistor 175 and capacitor 176. The respective response times of relay circuit means 123 and 122 are such that the relay winding 122b will have sufficient time to be energized if an error signal is present and detected and thereby activate its respective armature relay switches 130, 122c before relay winding 123a is sufficiently energized to activate its respective armature relay switches 123a, 123d, 123e. However, in the absence of an error signal and the consequent energization of relay winding 123c, armature relay switch 123a is displaced from contact 123b thereby opening the circuit path connecting battery 174 to relay winding 121b and de-energizing the latter. Switch 171 being open, the armature relay switches 121c, 121d, 121e are displaced from contacts 121a, 121f, 121g, respectively, causing battery 174 to be disconnected from relay windings 123c and 124a. The response time of relay circuit means 124 is such that sufficient energization of relay winding 124a to activate its respective armature relay switch 124b is prevented until the time required for relay circuit means 123 to be able to cause the de-energization of winding 121b has expired. Thus the continuously operated motor 142 is prevented by braking means 149, which is energized by battery 177 through the circuit path comprising armature relay switch 124b and contact 124c, from rotating the rotor shafts 117–119 and thereby insuring that no false error signal is generated in the output of transfer circuit 126. The response time of motor 141 is such that when the armature relay switch 123e is placed in contact with contact 123g, motor shaft 143 is not capable of being rotated until a time interval, which is sufficient to allow relay winding 123c to become de-energized as aforedescribed, has elapsed. Hence in the absence of a detected error signal, motor 141 will be energized when relay winding 123c is de-energized. The various armature relay switches of circuit means 121–125 and the other type switches are returned to and/or are in their original positions as illustrated in FIG. 2 upon the de-energization of relay windings 123c, 121b and the analogue converter is ready for another detection cycle. It should be noted, that because no rotation is transmitted to the rotor shafts 117–119 for the reasons previously explained, switches 125a, 125b, 125c remain closed and relay winding 125g continues to be energized by battery 178. As a result contact 125h is not in contact with relay armature switch 125i and under these conditions no effect takes place when relay armature switch 123d is placed in contact with or removed from contact 123f, as aforedescribed.

In the presence of an error signal from the output of transfer circuit 126, when switch 171 is temporarily closed, the relay winding 121b is again energized and the armature relay switches 121c, 121d, 121e are placed in contact with contacts 121a, 121f, and 121g as before. However, this time the relay winding 122b is energized due to the error signal detected by amplifier 173 and armature relay switch 130 is placed in contact with contact 130a causing battery 160 to provide an output signal $E_o$ at output terminals 131 and 132. Also armature relay switch 122c is placed in contact with contact 122d, thus preventing energization of the relay winding 123c by the battery 174. A short time thereafter and when switch 171 has been released and relay winding 121b is being energized by the battery 174, relay winding 124a is sufficiently energized to remove armature relay switch 124b from contact 124c and place it in contact with contact 124d causing, respectively, braking means 149 to be de-energized and unlocked and braking means 148 to be energized and locked. Hence, the revolution of motor shaft 144 of motor 142 is transmitted to the rotor shafts 117–119 and the control transformers 111–113 commence to be driven at their exclusive operational speeds, to wit: one-speed, 36-speed, 648-speed, from their respective electrical zero positions to their respective null positions and in the direction, which is counter-clockwise for the illustration of FIG. 2, required to displace switches 125a, 125b, 125c from contacts 125d, 125e, 125f as previously described. As a result relay winding 125g is de-energized and armature relay switch 125i is placed in contact with contact 125h.

When the control transformers 111, 112, 113 are driven to their respective null positions by the motor 142, a zero or substantially negligible signal appears at the input of detector amplifier 173 causing relay winding 122b to become de-energized and the relay armature switches 130, 122c to be removed from contacts 130a, 122b and placed in contact with contacts 130b, 130a, respectively. Thus, the output signal $E_o$ at the terminals 131, 132, is terminated and the battery 174 is connected to relay winding 123c causing energization of the latter. As a result of the energization of relay winding 123c, relay winding 121b is de-energized and the input of detector amplifier 173 is uncoupled from the output of transfer circuit 126 when armature relay switch 121c is released from contact 121a. Also battery 174 is removed from the relay winding 123c. However, relay winding 123c remains energized by battery 178 through the circuit path comprising armature relay switch 125i, contacts 125h, 123f and armature relay switch 123d. In addition, relay winding 124a is de-energized when armature relay switch 121e opens and disconnects battery 174. As a result armature relay switch 124b is removed from contact 124d thereby unlocking braking means 148 and the switch 124b is placed in contact with contact 124c causing battery 177 to energize and lock braking means 149.

As is obvious, the response time of the relay circuit means 123 and 121 are such that relay winding 123c is sufficiently energized so as to be able to effectuate, inter alia, the displacement of armature relay switch 123a from contact 123b and the relay winding 121h is sufficiently de-energized to remove, inter alia, armature relay switch 121e from contact 121g, while the output signal from transfer circuit 126 is still negligible. In this manner, the continuously operated motor 142 is prevented from generating a false error signal in the output of the transfer circuit 126 after control transformers 111–113 have reached their respective null positions and before armature relay switch 121c is opened. Control transformers 111–113 now commence to be driven by motor 141 at substantially the same or equal speeds and in an opposite direction which is clockwise for the illustration of FIG. 2. The rotation of the motor shaft 143 is transmitted to the respective rotor shafts 117, 118, 119, the motor 141 having been energized by the source 145 through the circuit path comprising armature relay switch 123e and contact 123g. When each of the control transformers is driven to its respective electrical zero position by motor 141, the rollers 164–166 engage the respective indents located on cams 161–163 causing switches 125a, 125b, and 125c to be placed in contact with contacts 125d, 125e, and 125f, respectively. As a result, relay winding 125g is energized by the battery 178 and armature relay switch 125i is removed from the contact 125h thereby de-energizing relay winding 123c. At this time, the relay armature switch 123a is placed in contact with contact 123b and relay armature switches 123d, 123e are removed from the contacts 123f and 123g, respectively. The rotations of shaft 143 terminates when the source 145 is disconnected from motor 141 by the opening of armature relay switch 123e. Under these conditions, the analogue converter is again ready for another detection cycle.

It is to be observed therefore that the present invention provides for an analogue converter for converting angular displacement to a time correlated signal. A signal proportional to the angular displacement to be converted, i.e., a first output signal is provided by a multi-speed transmission synchro system, the individual transmitters of which are preset to operate of mutually exclusive different speeds. A second signal output, which is proportional to the first signal is provided by a related multi-speed receiving synchro system of the control transformer rotor type which is responsive to said first output signal. The rotors of the individual receiving synchros are driven by driver means which in turn are responsive to control means. The control means provide a control signal for controlling the driver means to drive the individual rotors to their null position, during a forward drive cycle in the presence of said second output signal and to their electrical zero position in the absence of said second output signal during a reverse drive cycle. During the period the driver means drive the rotors to their null position, a time correlated signal is provided from a reference signal source. Gating means coupled to said source and responsive to said control signal selectively switch the source to provide the time correlated signal during the timer period the rotors are being driven to their null position. The driver means include a forward drive cycle gear train having gear means to operate the indivdual rotors at mutually exclusive different speeds corresponding to the preset different speeds of the multi-speed transmission synchro system; a reverse drive cycle gear train having gear means to rapidly turn the individual rotors to their electrical zero position in about one turn, and slip clutch means in one of said gear trains set to permit the respective gear trains to drive the individual synchros during each cycle. Each gear train further includes electrically operated braking means responsive to the control means permitting only the proper gear train to operate during each cycle.

The driver means also include a separate motor responsive to the signal from the control means for each drive cycle, each motor driving in only one direction. The reference signal source and gating means coupled thereto can be a simple D.-C. current source responsive to a relay switch. The zero electrical position of the rotors can be indicated by a cam which will close a switch at a certain cam position. When all the cams are in said cam position, a circuit is closed which stops the forward drive cycle gear train and stops the reverse cycle gear train.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. An analogue converted for converting angular displacement to a time correlated signal comprising, in combination:
   a multi-speed transmission synchro system, the individual transmitters of which are preset to operate at mutually exclusive different speeds, to provide a first output signal proportional to the angular displacement to be converted; a related multi-speed receiving synchro system of the control transformer rotor type, responsive to said first output signal to provide a second output signal proportional thereto;
   driver means for driving the respective rotors of the control transformer synchros of said multi-speed receiving synchro system including a forward drive cycle gear train having gear means to operate the individual control transformer rotors at mutually excluisve different speeds corresponding to the preset different speeds of the multi-speed transmission synchro system and a reverse drive cycle gear train having gear means to rapidly turn the individual rotors to their electrical zero position in about one turn;
   control means to provide a control signal for controlling said driver means to drive said rotors to the null position of said multi-speed receiving synchro system in the presence of said second output signal and to the electrical zero position of said multi-speed receiving synchro system in the absence of said second output signal;
   a source of reference signal; and
   gating means coupled to said source and responsive to said control signal for selectively switching said source to provide said time correlated signal during the period said driver means drives said rotors to said null position.

2. A converter as claimed in claim 1, at least one of said gear trains including slip clutch means set to permit the respective gear trains to drive the individual rotors during each cycle.

3. A converter as claimed in claim 2, each gear train including electrically operated braking means responsive to the control means permitting only the proper gear train to operate during each cycle.

4. A converter as claimed in claim 3, the driver means including a separate motor responsive to the signal from the control means for each drive cycle, each motor driving in only one direction.

5. A converter as claimed in claim 4, each of said rotors including a shaft and cam and a switch closed by said cam at a preset cam position, a circuit being closed when the switches for all said rotors are closed which circuit stops the forward drive cycle and starts the reverse drive cycle.

6. An analog converter for converting angular displacement to a time correlated signal comprising in combination:
   a multi-speed transmission synchro system having a plurality of individual transmitters which are preset to operate at mutually exclusive different speeds, including an input coupling for coupling to an external device whose angular displacement is to be measured, said transmission system providing a first signal when there is an angular displacement;
   a multi-speed receiving synchro system having a like plurality of receiving synchros, the individual components of the receiving system being electrically coupled to corresponding components of the transmission system, said receiving system including a like plurality of rotors normally positioned at a zero position in the absence of any first signal;
   a transfer circuit to which is fed a second signal which is the output of said receiving system having sensing means to sense said second signal;
   relay circuit means acted on by said transfer circuit;
   first and second motors responsive to said relay circuit means, a forward drive gear train driven by said first motor having gear means to drive said individual rotors from their zero positions to a null position with respect to the corresponding individual transmitters, said forward drive gear train having gear ratio linkages for said individual rotors corresponding to said preset different speeds, and a reverse drive gear train driven by said second motor having gear means to drive said individual rotors from their null positions back to their zero positions, said reverse drive gear train gear ratio being about one to one;

forward and reverse slip clutch means in said forward and reverse drive gear trains to permit the respective gear trains to drive the individual rotors during each cycle, and braking means responsive to said relay circuit means permitting only the proper gear train to operate during each cycle;

a cam and shaft connecting said gear trains and said rotors, a switch responsive to each cam closing when said cam is at a preset cam position corresponding to the zero position, a circuit closing when all of said switches are closed connected to said relay circuit means, to change the positions of mid-relay circuit means from the forward to the reverse drive cycle; and a signal source with gating means likewise responsive to said relay circuit means acting to provide an output signal during said forward drive cycle.

References Cited

UNITED STATES PATENTS 3,217,318   11/1965   Masel _____ 340—347

DARYL W. COOK, *Primary Examiner.*

MAYNARD R. WILBUR, *Examiner.*

W. J. KOPACZ, *Assistant Examiner.*